United States Patent [19]

Loucks

[11] Patent Number: 5,440,855
[45] Date of Patent: Aug. 15, 1995

[54] ROOFING STRUCTURE AND METHOD

[76] Inventor: Harry Loucks, 1812 Spring St., Little Rock, Ark. 72206

[21] Appl. No.: 286,183

[22] Filed: Aug. 5, 1994

Related U.S. Application Data

[62] Division of Ser. No. 957,136, Oct. 7, 1992, Pat. No. 5,343,664.

[51] Int. Cl.⁶ .................................................. E04D 1/30
[52] U.S. Cl. .......................................... 52/518; 52/536; 52/542; 52/555; 428/906
[58] Field of Search .............. 52/518, 536, 542, 55, 52/750; 428/141, 906

[56] References Cited

U.S. PATENT DOCUMENTS

| 1,226,477 | 5/1917 | Dickelman | 52/518 |
| 4,603,529 | 8/1986 | Cronenwett et al. | 52/536 |
| 4,611,451 | 9/1986 | Symbold | 52/555 |
| 5,343,664 | 9/1994 | Loucks | 52/518 |

Primary Examiner—Carl D. Friedman
Assistant Examiner—Christopher T. Kent
Attorney, Agent, or Firm—Jim Zegeer

[57] ABSTRACT

Roofing components and method for pitched roofs includes a flexible base and one or more ranks of integrally formed thin blades, vanes or fins extending outwardly from the base. The blades, fins or vanes are spaced substantially parallel to each other and overlap to shadow lower elements and to provide air circulation and between blades, which are designed to sluff-off heat and impede thermal energy being transmitted to the roof. The blades, fins or vanes are flexible and resilient so as to absorb the impact of falling material (limbs, etc.). One edge portion of the base is free of blades to provide an overlapped area for installation on a pitched roof. Various overlapping and interlocking arrangements are disclosed for sealing purposes.

4 Claims, 19 Drawing Sheets

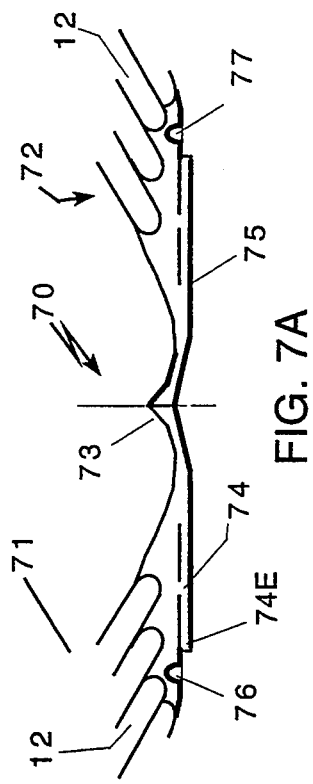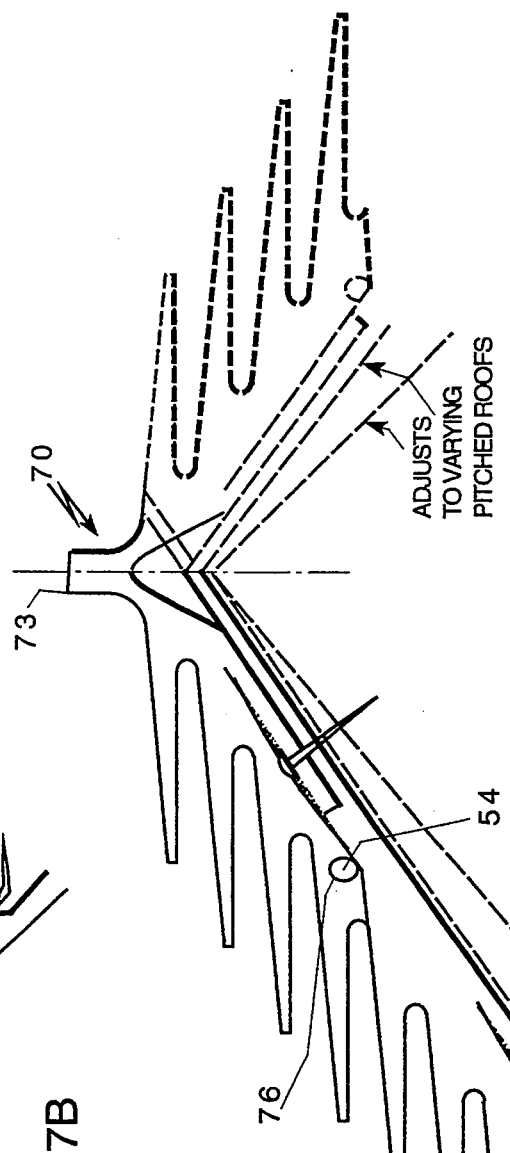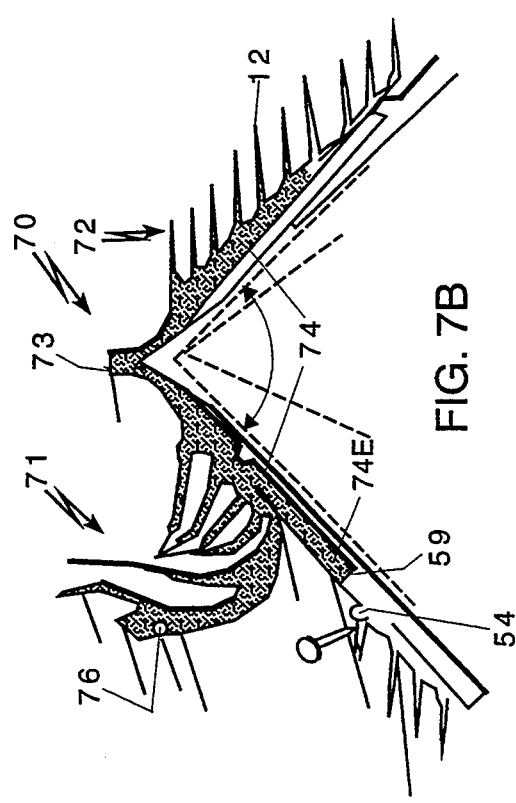

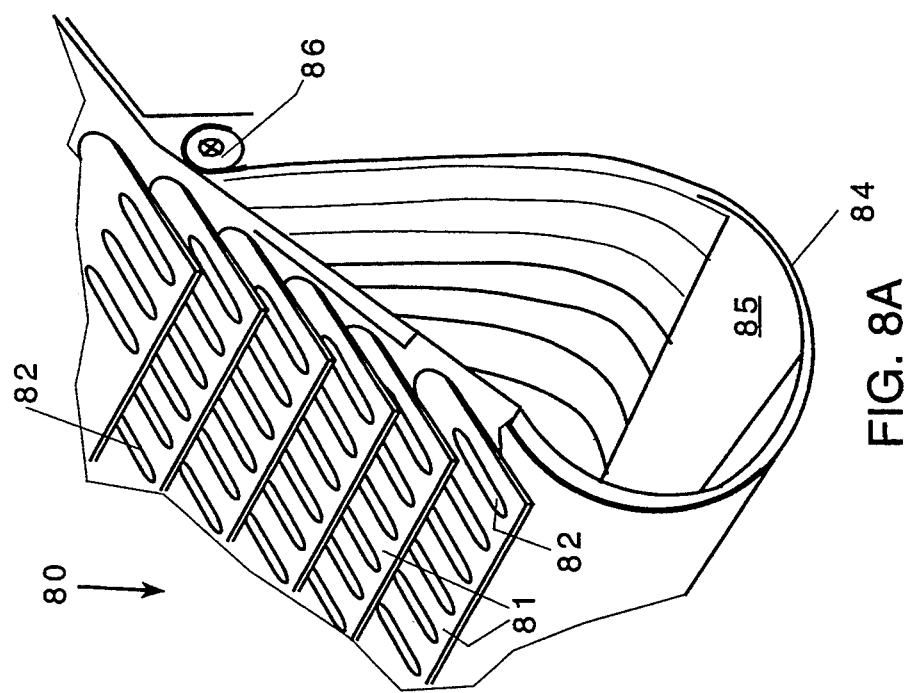
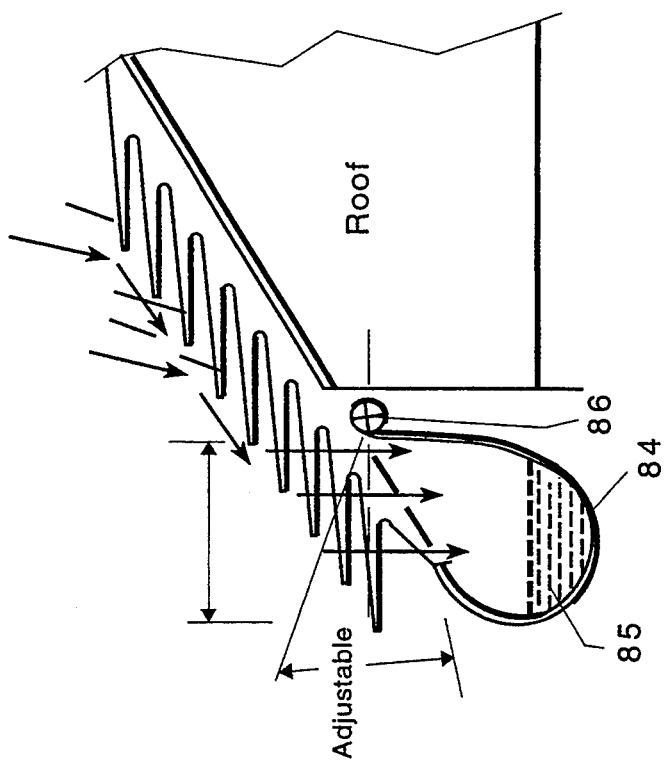
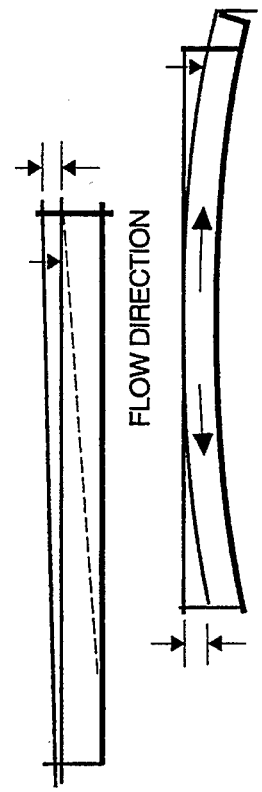

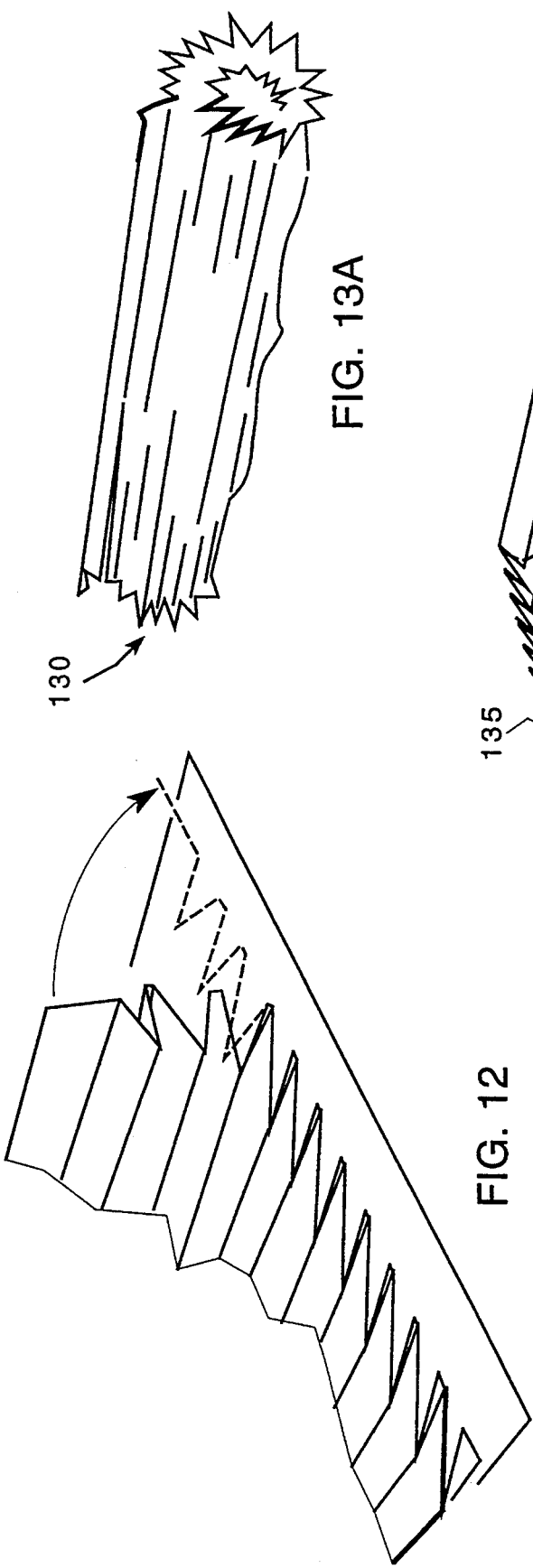
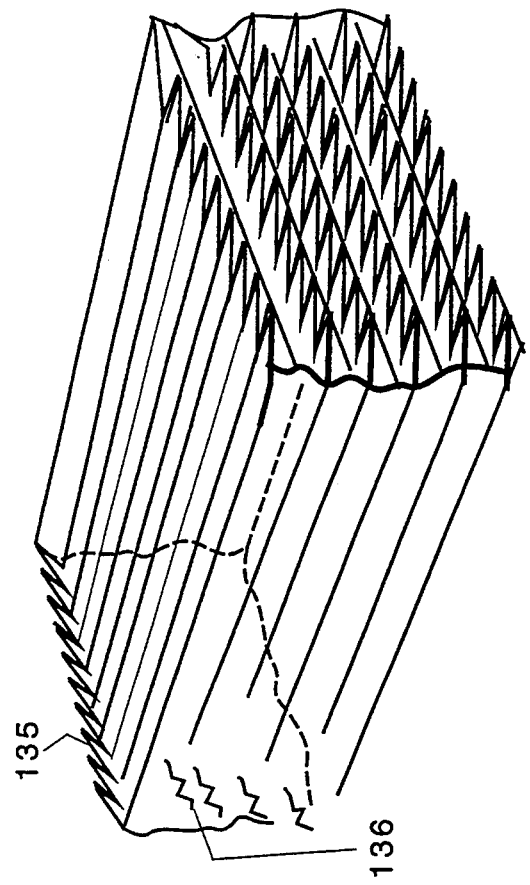
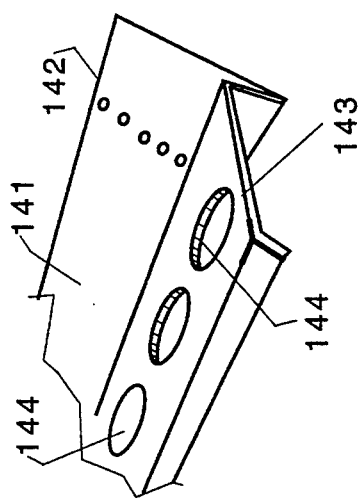
FIG. 13A
FIG. 13B
FIG. 12
FIG. 14A

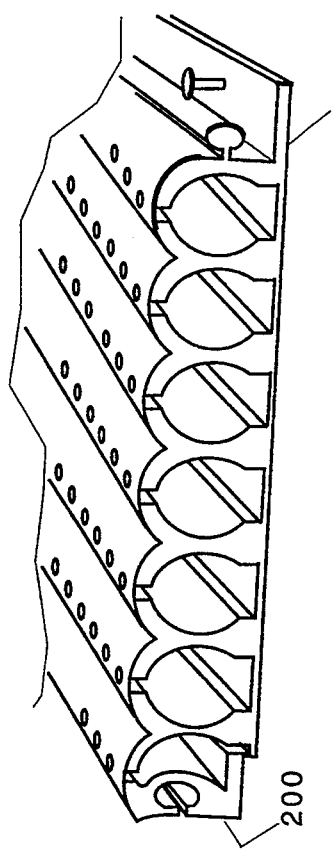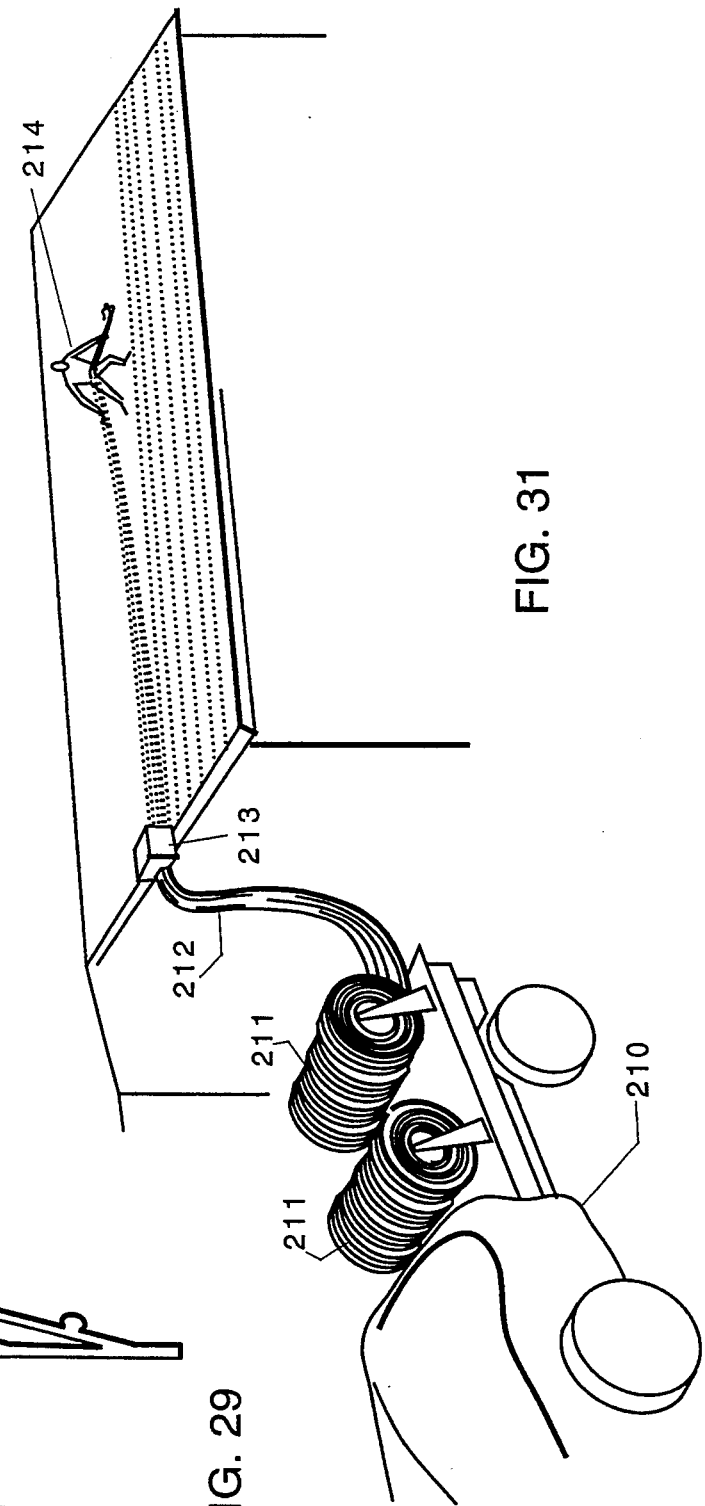
FIG. 30
FIG. 31
FIG. 29

ROOFING STRUCTURE AND METHOD

This is a divisional of application Ser. No. 07/957,136, filed Oct. 7, 1992 now U.S. Pat. No. 5,343,664.

BACKGROUND AND BRIEF DESCRIPTION OF THE INVENTION

This invention relates to a roofing products and structures and method and, more particularly, to roofing products for pitched roofs which are constituted by integrally molded or formed fins, vanes or blades which provide shading and air circulation, air space for heat insulation and debris impact absorbing functions.

In the prior art, asphalt, asbestos, or wood shingles, clay tile, slate, etc. have been used in roof construction wherein after the usually 4×8 (plywood or particleboard) sheets have been installed, an impregnated paper is rolled upon the roofing base and then shingles of various constructions are layered directly upon this construction. When the shingles are asbestos, asphalt and the like reflective marble chips, and similar materials have been adhered to the surface of the roofing product, to keep the roof cool, it is still quite common for the interior structure to become extremely hot because of the absorption and transmission of radiant or solar energy from the sun. Cooler clay and slate roofing materials are heavy and require substantially sturdier roof foundation structures to maintain them in position. In addition, when these clay and slate roofs are damaged, repair of them is costly and difficult.

The object of the present invention is to provide improved roofing products which can be easily and quickly installed, which provide both air circulation, thermal insulation and impact energy absorption at relatively low cost.

According to the invention, roofing, whether in shingle form or in roll form is provided for pitched roofs which is constituted by integrally molded or formed blades, vanes, fins and the like and a flat attachment or securement member or panel. These blades provide shade to the roof, convert radiant energy to thermal energy at a distance from the attachment as securement member and air circulation in the spaces between the blade, vanes or fins to sluff-off thermal energy, as well as providing shading for the next lower fin by virtue of the overhang of fins immediately thereabove. Since the blades, vanes or fins are thin elements, heat transfer to the roof is greatly attenuated. Moreover, the fins, blades forming the vented roofing structure absorb impact of falling limbs, stones, hail and the like. In a preferred embodiment, a base attachment structure or securement member for laying flat on the roof support foundation structure is provided with one or more outwardly extending fins or blades which, depending on the pitch of the roofing, provides a high degree of shading for the underlying structure and, a high degree of air circulation between blades or fins.

In addition, the blades, vanes or fins may have ribbed surfaces which makes them more conducive to sluffing off heat. These heat sluffing ribs may be on the top, bottom or both surfaces. This form of self-shading roof construction may have the fins or vanes or blades manufactured as curved with deformed, notched or peripherally modified leading edges so as to allow for the ventilation or air to circulate and also to draw off heat build-up. While in one preferred embodiment, the blades are horizontal relative to the roof, in effect, the roofing provides a multiple roof configuration which shades, ventilates and protects each other and, in another preferred embodiment, the vanes, blades or fins are vertical, in other embodiments, the blades, vanes or fins could be at other angles.

Roofing structure according to the invention allow and promote (through convection) circulating air around and between the roof to absorb heat and carry it away (just as air passing through an automobile radiator). In some embodiments, pockets of air are sealed to form insulated low heat transfer spaces below the roofing per se.

The roofing can be implemented in conventional shingle sizing or roll roofing form and manufactured by casting, extrusion, folding from sheet stock, rubber and plastics (such as PVC, white PVC is presently being utilized in sheet formatted flat roofing for industrial buildings HYPALON TM) and smooth or rough surface textured, tapered or straight blades or vanes. As noted above, all of the embodiments protect not only from solar energy (heat) but from impacts such as hail and falling limbs. Furthermore, any snow or ice built-up on the outer layers is insulated from the base layers by the intervening air spaces and pockets. Even wind forces, depending on their angle of attack (e.g., the vector angle) will, in summer, cool both vane surfaces and, in winter, be prevented from heat extracting air flows over the roof by trapped elongated pockets of air and any small minute fluttering of the vanes or blades in winds will tend to prevent ice build-up, particularly in the milder or temperate climates.

In the preferred embodiment, the roofing is provided with integral tabs for attaching the roofing to the roof sub-base structure. In one embodiment, an alignment ridge is formed on the selvage or underlap edge of the roofing which may be provided with one or more nailing grooves or nail locating grooves. An alignment rib or tongue and coacting alignment groove snap together to securely integrate the roofing by interlocking of the ranks of individual products to each other. A roof peak element has two sides, one for each roof side and is flexible to accommodate varying roof pitches.

In still another embodiment, the vanes, fins or blades are in the form of T-shaped or curved ribs, there being alternate tall and short T-shaped or curved ribs with their overlapping blades formed in an extrusion with edges that interfit and interlock with adjoining ranks or tiers of roofing members so that the roofing can be installed more rapidly working from one edge of the roofing (say the left edge to the opposite edge, say the right edge) and function as an integrated roof.

DESCRIPTION OF THE DRAWINGS

The above and other objects, advantages and features of the invention will become more apparent when considered with the following specification and accompanying drawings wherein:

FIGS. 8A, 8B and 8C illustrate novel guttering integral to roofing according to the invention, FIG. 12 illustrates installation of the embodiment of the invention shown in FIG. 11, FIGS. 13A AND 13B illustrate a rolled and prebonded flat sheets, respectively, of the embodiment illustrated in FIGS. 11 and 12, FIG. 14A illustrates the blades, fins or vanes of the invention as single piece roofing elements, FIG. 29 is a diagramatic illustration of a technique for notching, punching operation which can be facilitated by bending the vanes, fins or blades over a mandrel so as to spread them apart (which can be done or executed as it leaves an extrusion die, or later), FIGS. 30 illustrate further vented tubular embodiment of the invention, FIG. 31 illustrates how the roofing can be carried to a building and installed thereon.

DETAILED DESCRIPTION OF THE INVENTION

The numerous embodiments disclosed herein are sized for illustration only, the functions depicted can very well be provided by smaller or larger roofing elements because in the basic aspects of the invention, the roofing allows and promotes through convection circulating air around between the different roof elements to absorb heat and carry it away and a shadowing effect on the succeeding lower elements. Heat generated in the fins, blades or vanes sees a high thermal impedance and are cooled or radiate thermal to the ambient atmosphere.

Figure 1:
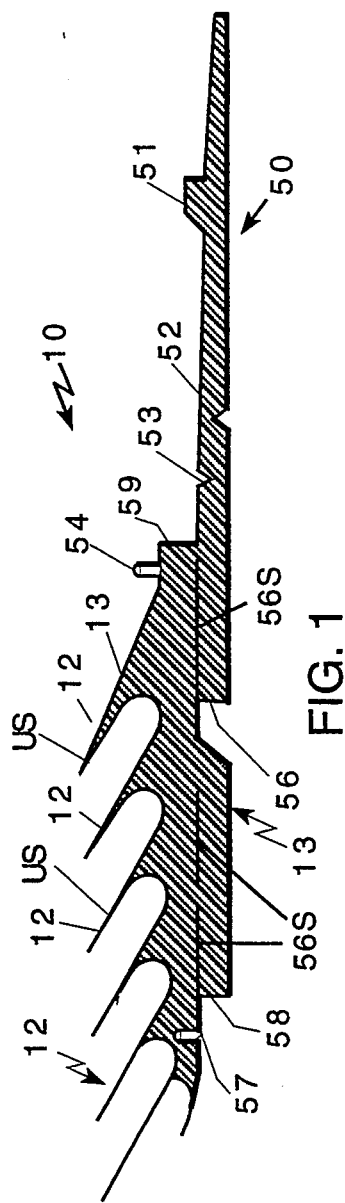
FIG. 1 is a sectional view through a roofing element incorporating the invention.

Referring to FIG. 1, the right or what will become (in this embodiment) the upper edge of the roofing element 10 is provided with a tapered edge 50 and which may include an alignment ridge 51. The left or lower portion of the overlap area 52 includes a nail groove 53 which provides an easy guide for the installer for positioning placing the nails and, may also include an alignment rib 54, which assures parallelness of individual fins or vanes and thereby facilitates installation. In addition, an alignment groove 56 is provided for receiving alignment ridge 51 of an underlying roof element. Alignment groove 57 and the notch 58 interlock and receive alignment rib 54 and edge 59 on the next underlying roofing element. The roof element 10 can, of course, incorporate elongated air spaces such as 33 shown in FIG. 4.

As shown later, holes or passages may be formed to allow air to flow by convection or by wind induced flows to provide cooling flows and carry away heat that is generated by the sun's rays impinging upon the upper surfaces US of the vanes, blades or fins. It will be noted that the sun's rays can reflect off of the upper surfaces US of the fins, blades or vanes and, at the same time, a shadow from an upper vane onto a lower vane or a root of a lower vane is provide so as to shield these portions and the base B from the sun's rays. Since the vanes, fins or blades 12 are relatively thin, their upper and lower surfaces emit the heat that may be absorbed from conversion of radiant or solar energy from the sun and that heat is carried away by the air flow, by convection and otherwise as described later. The thin blades 12 have a high thermal impedance in the plane of the blade and little heat or thermal energy is conveyed to the base structure B. This shading and ventilating effect in each upper vane protecting a lower vane, prevents solar heat build-up and, in particular, significantly reduces the heat transferred through the base B to the internal living space of the building.

Figure 16:
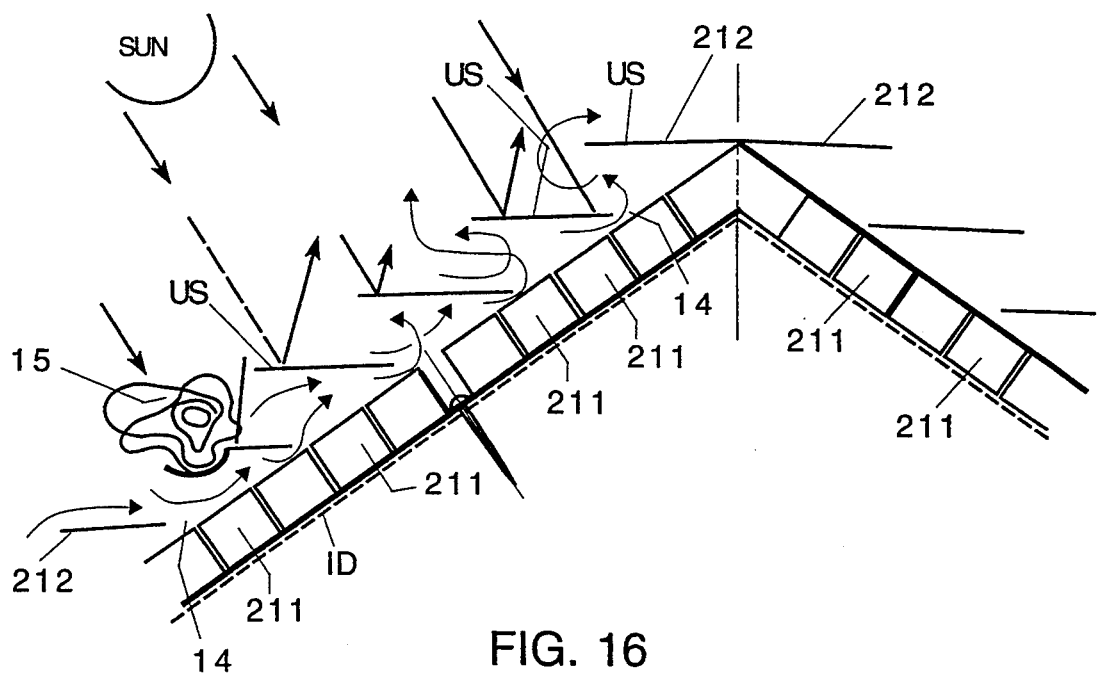
FIG. 16 is a sectional view through an embodiment of the invention incorporating elongated insulating air passages.

Vanes, blades or fins 12 are preferably flexible so that objects such as a stone or limbs which falls on the roof has the energy thereof absorbed (see FIG. 16). The pockets of air 33 in the honeycomb structure (FIG. 4) are preferably sealed (using plug structures similar to those shown in FIG. 19) to further insulate the living space below the rafters and, at the same time, prevent the transmission of heat from inside the structure to the exterior. Any snow or ice build-up on the outer layers or on the blades or fins 12 is insulated from the base layer contacting the roofing particle board or plywood layer 33.

Figure 2A:
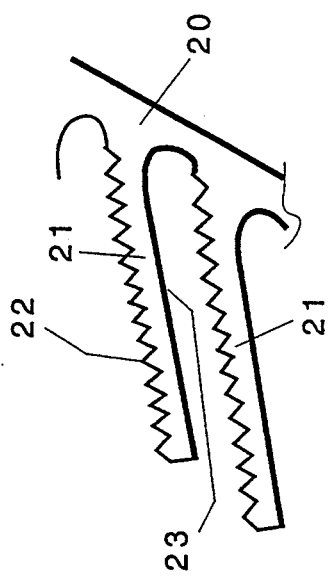
FIG. 2A–2E illustrate various fins, blade or vane constructions incorporating the invention.
Figure 2C:
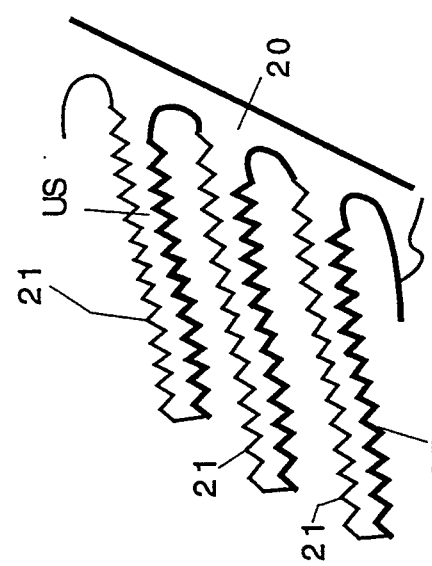
Figure 2B:
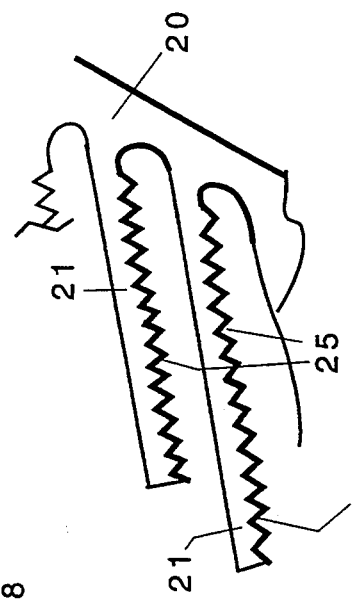

Referring now to FIGS. 2A–E, flexible base 20 has formed integrally therewith ranks or tiers or arrays of blades, vanes or fins 21 which are provided with a ribbed upper surface 22 and a smooth bottom surface 23, the ribbed surfaces being more conducive to sluffing-off heat. Moreover, the rib surfaces can be utilized to provide decorative ornamental aesthetic effects for appearance purposes. In FIG. 2B, flexible blades 20 is provided with integrally formed ranks, tiers or arrays of fins, blades or vanes 21 which have the upper surface smooth and the bottom or under surfaces 24 are provided with heat radiating ribs 25 for better radiating heat generated by the sun's rays impinging on the upper surfaces. The innermost or root portions of each blade except the upper-most blade in the upper-most rank is in the shadow of or is shadowed by the blades or blades immediately thereabove. Thus, due to the combined effects of spacing any heat generated away from the base substrate 20 and designing them so that they shadow one another, and cause the heat induced by impingement of sun rays thereon to be radiated and carried away by air convection so significantly less heat is transferred to the interior of the structure protected thereby.

In FIG. 2C, the flexible substrate or base 20 is provided with an array or tiers of blades 21 with the upper US and lower LS surfaces thereby being provided with minute ribs so that both the top and bottom surfaces are conducive to sluffing-off heat.

Figure 2D:
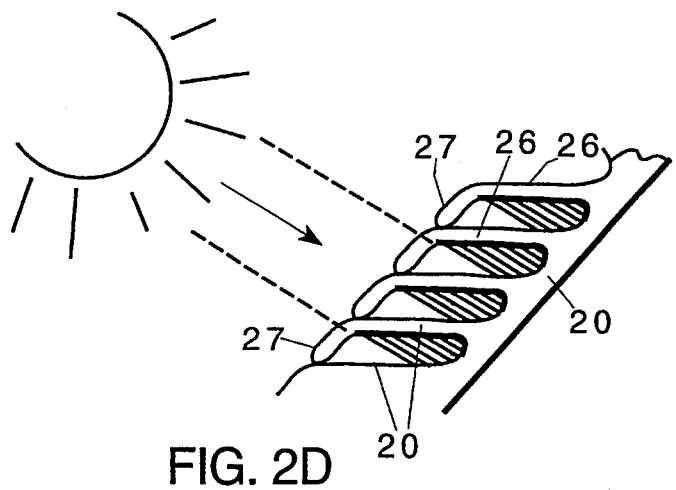
Figure 2E:
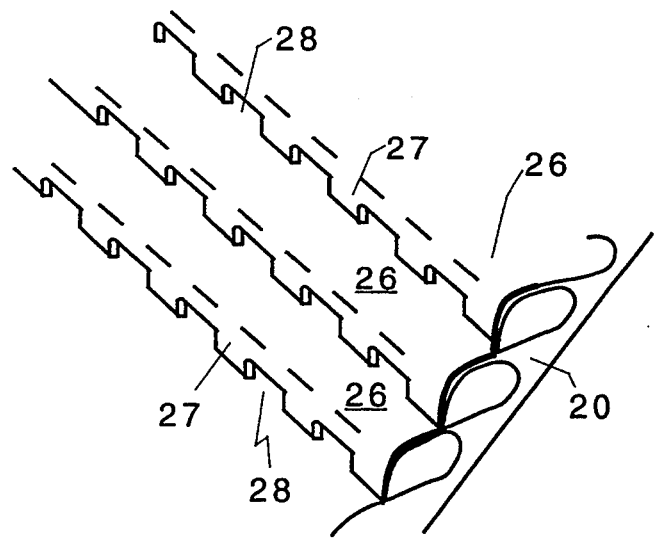

In FIG. 2D, the fins, vanes or blades 26 are integrally formed with the flexible base 20 and have their outer extremities 27 curved in a downward direction and, as shown in FIG. 2E, notches 28 or other appropriate apertures 28 are formed in the leading edges so as to allow for ventilation in air to circulate and draw off and prevent heat build-up.

Figure 3A:
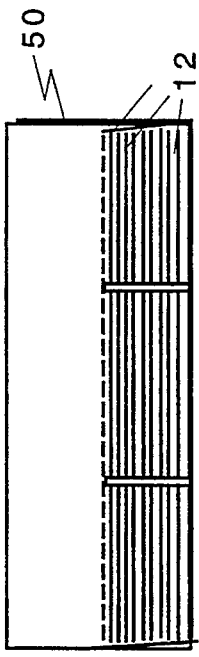
FIG. 3A is a plan view of a shingle incorporating the invention.

FIG. 3A shows the construction in the form of a conventionally sized shingle (for example, 12"×36") and includes a selvage or overlap edge 50 (the relationship between the overlap edge 50 and the application to roofing will be described later herein).

Figure 3B:
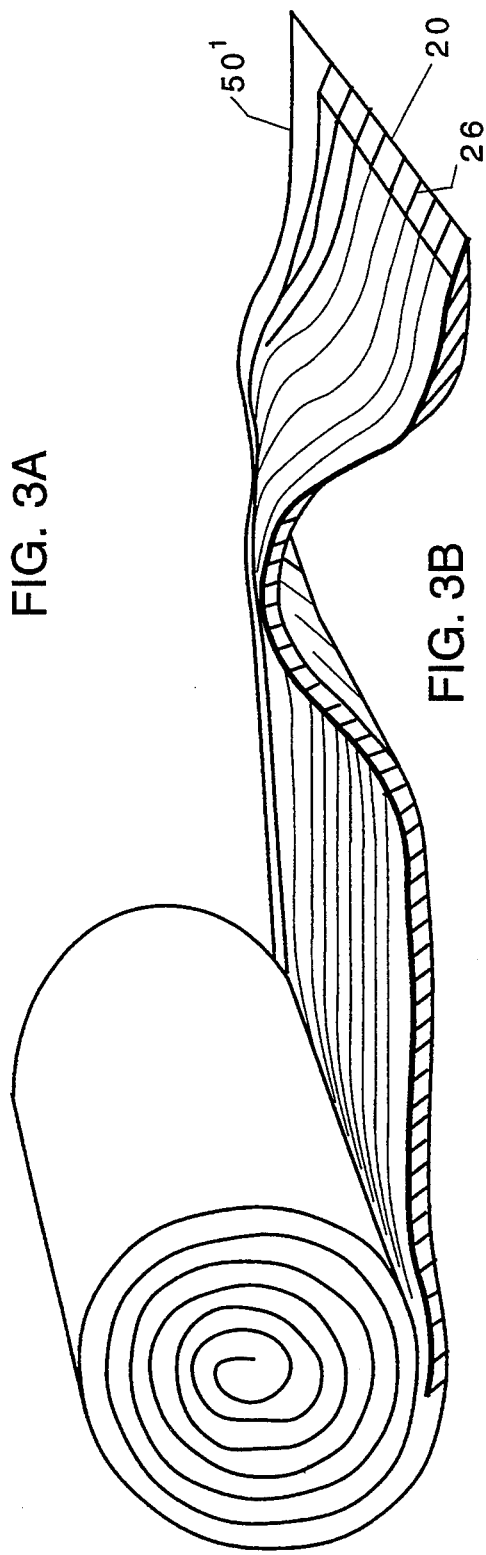
FIG. 3B is a isometric perspective view of roll roofing incorporating the invention.

In FIG. 3B, the flexible base 20 has vanes, blades or fins 6 formed thereon similar to the construction shown in FIG. 2D. In FIG. 3B, the roof material is supplied in the form of rolls.

Figure 4:
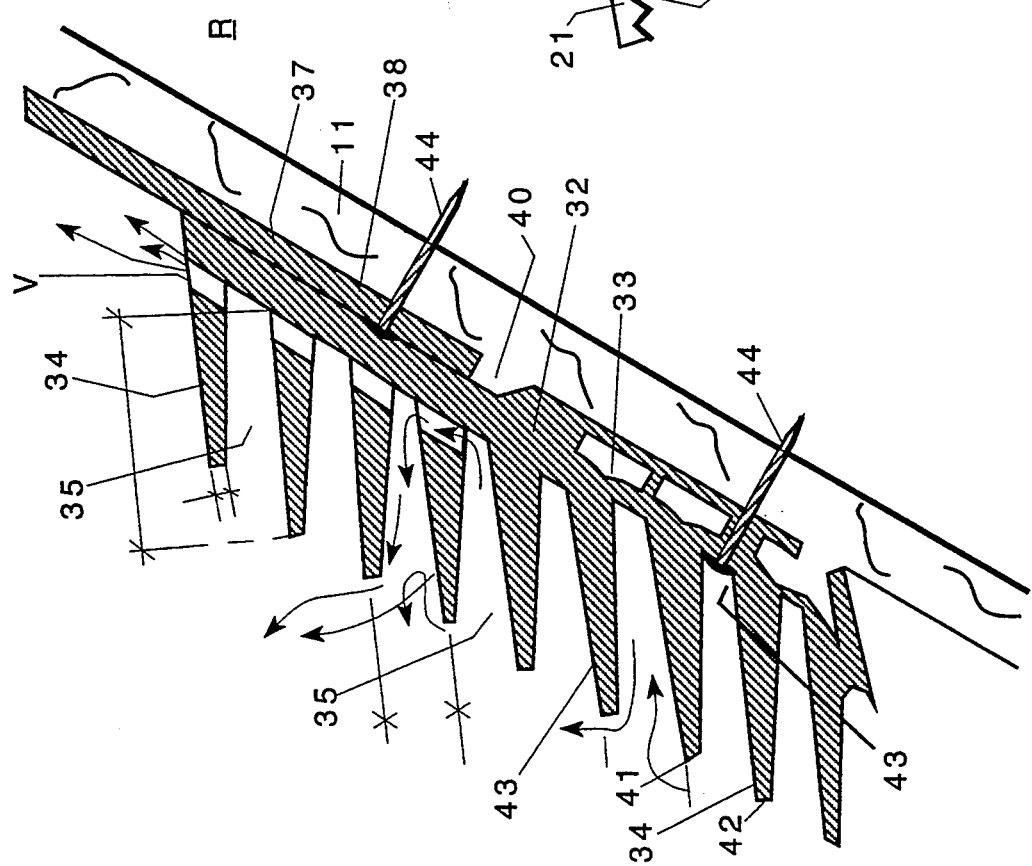
FIG. 4 is a sectional view of a roofing construction embodying a further embodiment of the invention.

In the embodiment shown in FIG. 4, the flexible base structure 32 is provided with a plurality of elongated air passages 33 and integrally formed vanes, blades or fins 34 which are preferably tapered from their roots or points of connection to the flexible base structure so that the air space 35 between blades, fins or vanes 34 grows or enlarges in a tapering direction away from the roof. The securement of the roofing according to this invention to the underlay structure is by nails 44. The lower part 37 of an upper flexible base 32 is provided with nail positions 38 for nailing purposes 39. In the embodiment shown in FIG. 4, a recess or cut-out 40 is provided in the upper end of the flexible base or carrier 32 to provide for overlapping the overlapping edge 37 of the upper roof covering of this invention.

Between selected blades, fins or vanes 41, and 42 can be provided a line for nails such that the blade 41, for example, can be deflected upwardly (which will in turn deflect those immediately adjacent 43 sufficient for a nailing purposes for nails 44.

Since the overhang of the blades immediately thereabove significantly by blade 41 immediately thereabove, the nails are shielded from the elements. It will be obvious that as will appear more fully hereafter, that various nailing or adhesive arrangements can be utilized so that there is no leaking or withdrawal of the nails due to temperature excursions in the roof according to this invention.

As shown in FIG. 4, it will be noted that as the roots of the fins, vanes or blades 34 are provided with apertures or vents V to allow any trapped air to escape and also to promote circulation when the wind blows.

Figure 5A:
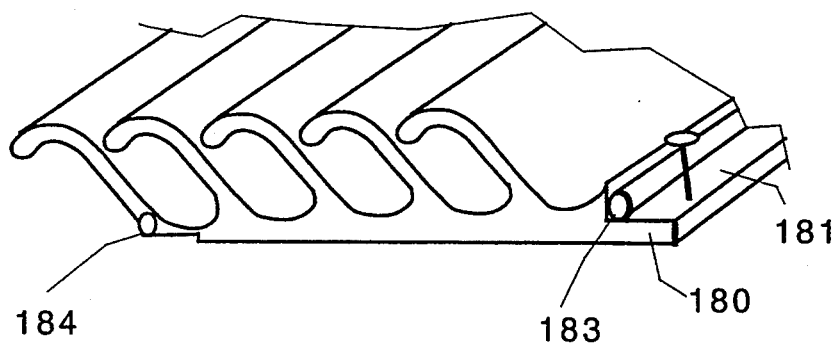
FIGS. 5A, 5B and 5C are sectional views of further embodiments of the invention.
Figure 5B:
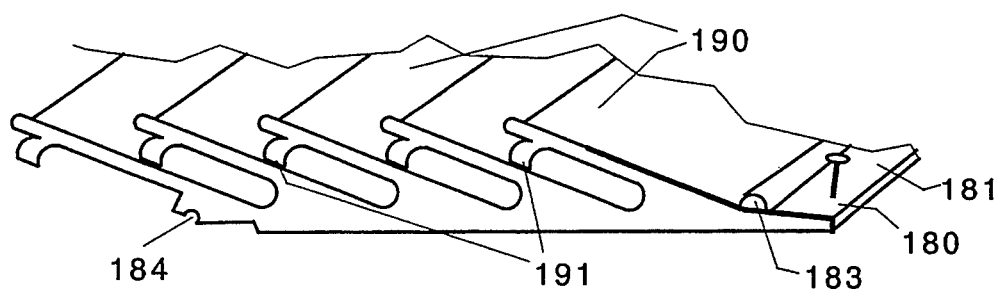
Figure 5C:
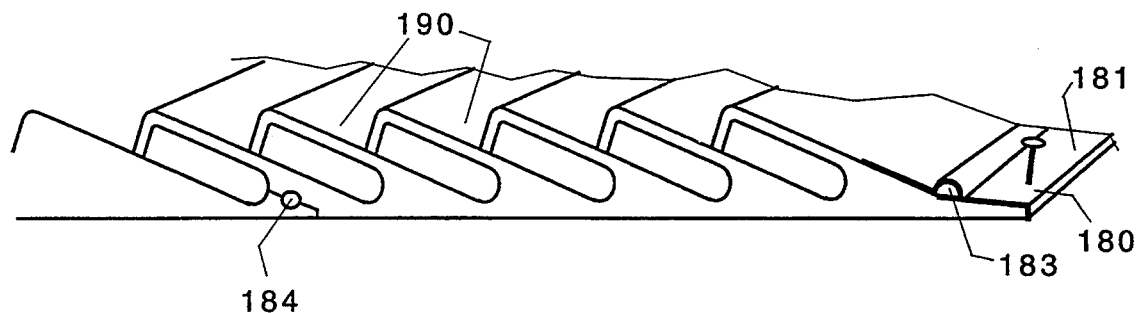

Referring now to FIGS. 5A–5C, the lateral edges have a overlapping rectangular portions 180 which serves as a nailing strip and 181 with coacting tongue 183 and groove 184 formations for sealing the nailing strip. Each end has longitudinally extending complementary interlocking formations so as to join and seal the edges. The embodiment shown in FIG. 5B is similar to the embodiment of FIG. 5A except that the ends of the vanes or blades or fins are joined to form a closed air spaces. In FIGS. 5B, the vanes, fins or blades 190 have downwardly dependent ribs 191 to form semi-closed passages or chambers.

FIGS. 6A–6G illustrate an installation sequence utilizing the end or edge construction shown in FIG. 5. In these illustrations, the roof structure is indicated at 60 and, the tapered extension 50 has been trimmed and the edge thereof positioned along the peak of the roof 60, so that installation in this embodiment begins at the peak. It will be appreciated that the sequence to be described is reverse of the normal roof installation sequence where one begins at the eaves and works towards the peak. Obviously, one could begin at the bottom or eaves and work toward the roof peak.

Figure 6A:
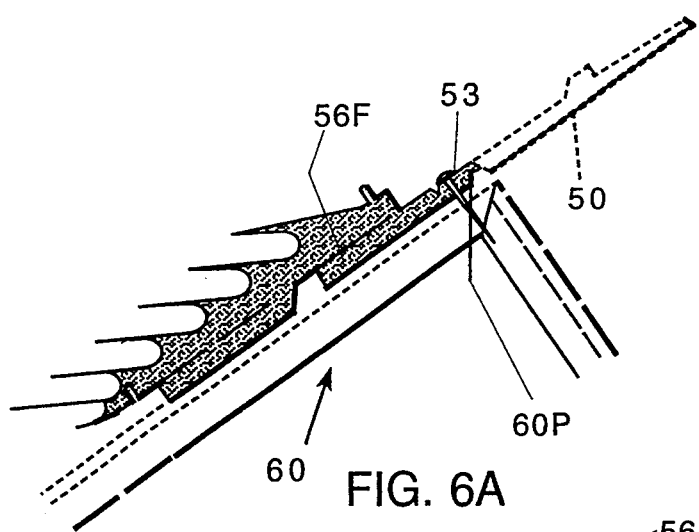
FIGS. 6A–6G illustrate an installation sequence of roofing disclosed in the embodiment of FIG. 1, FIGS. 7A, 7B and 7C illustrate the application of a ridge cap strip from a roll and its securement and connection to the elements.
Figure 6B:
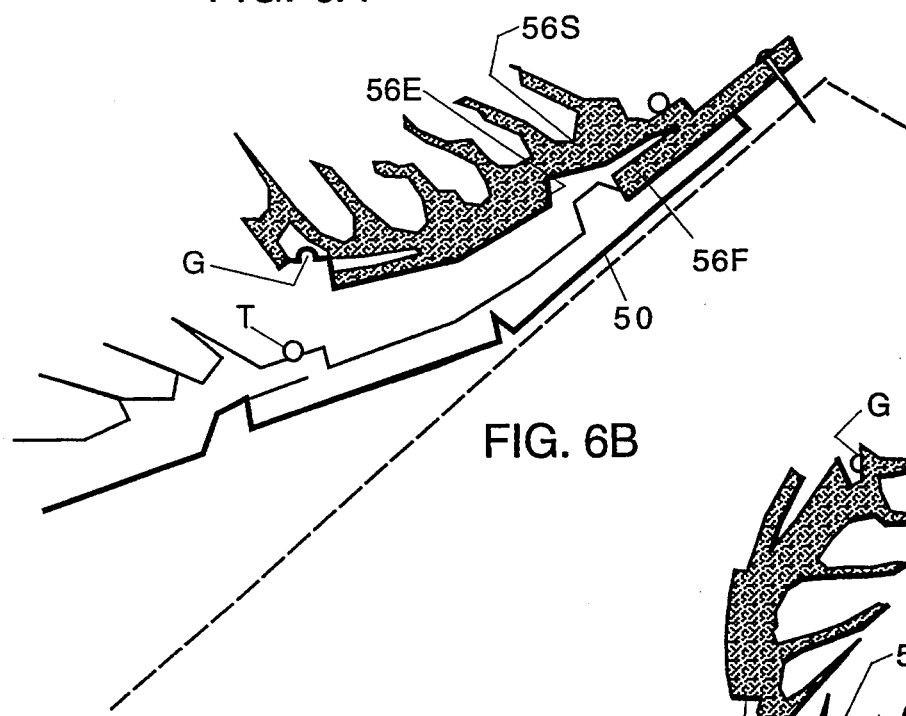

As shown in FIG. 6A, the nail groove 53 has been utilized to guide the placement of nails 61 along the peak 60P of roof structure 60. As shown in FIG. 6B, the slit remaining portion of this roof member is lifted upwardly, the slit 56F lending flexibility for this purpose. The tapered edge 50 including the guide alignment ridge 51 is then tucked under the lower edge of the upper roofing element until alignment ridge engages edge 56E of the tab formed by slit 56S.

Figure 6C:
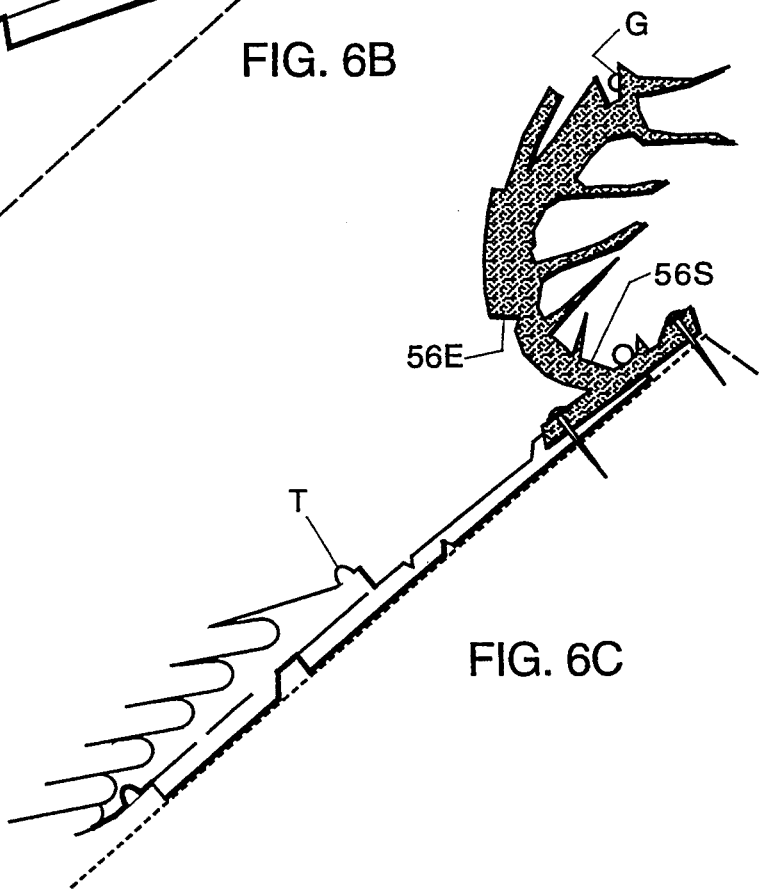
Figure 6D:
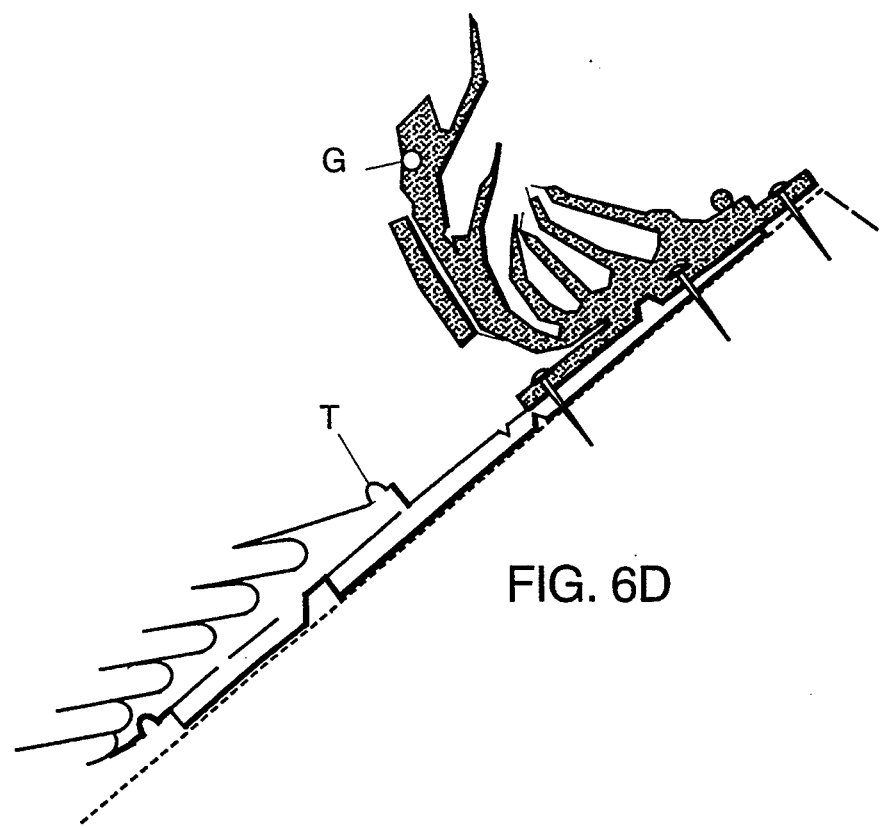
Figure 6E:
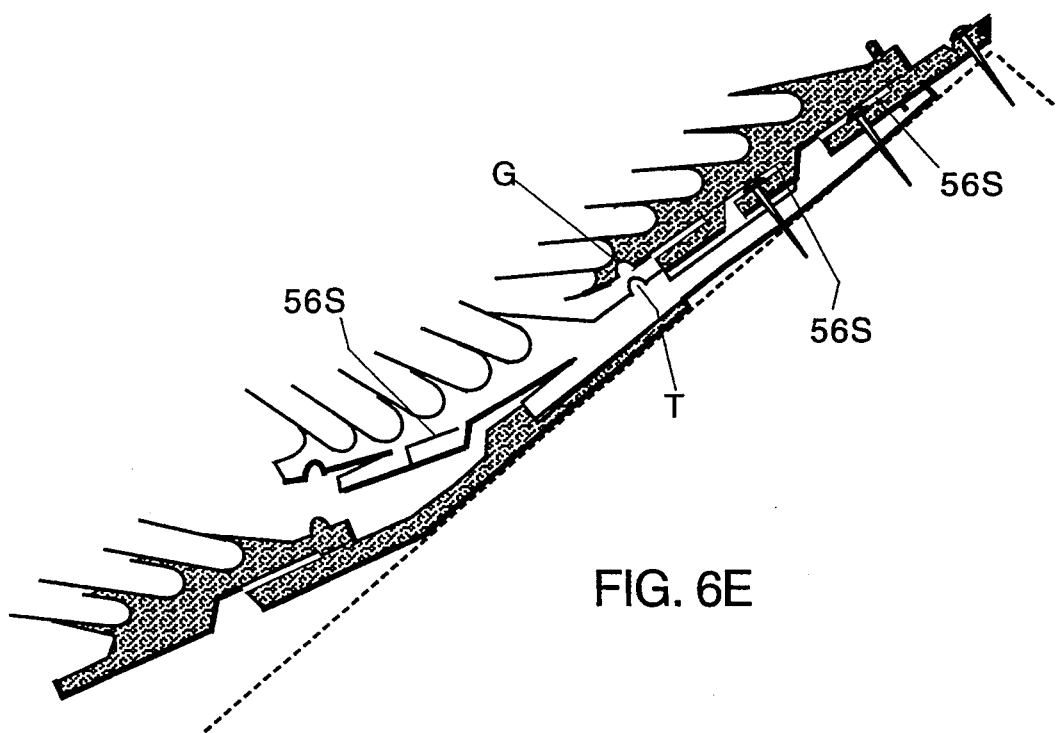
Figure 6F:
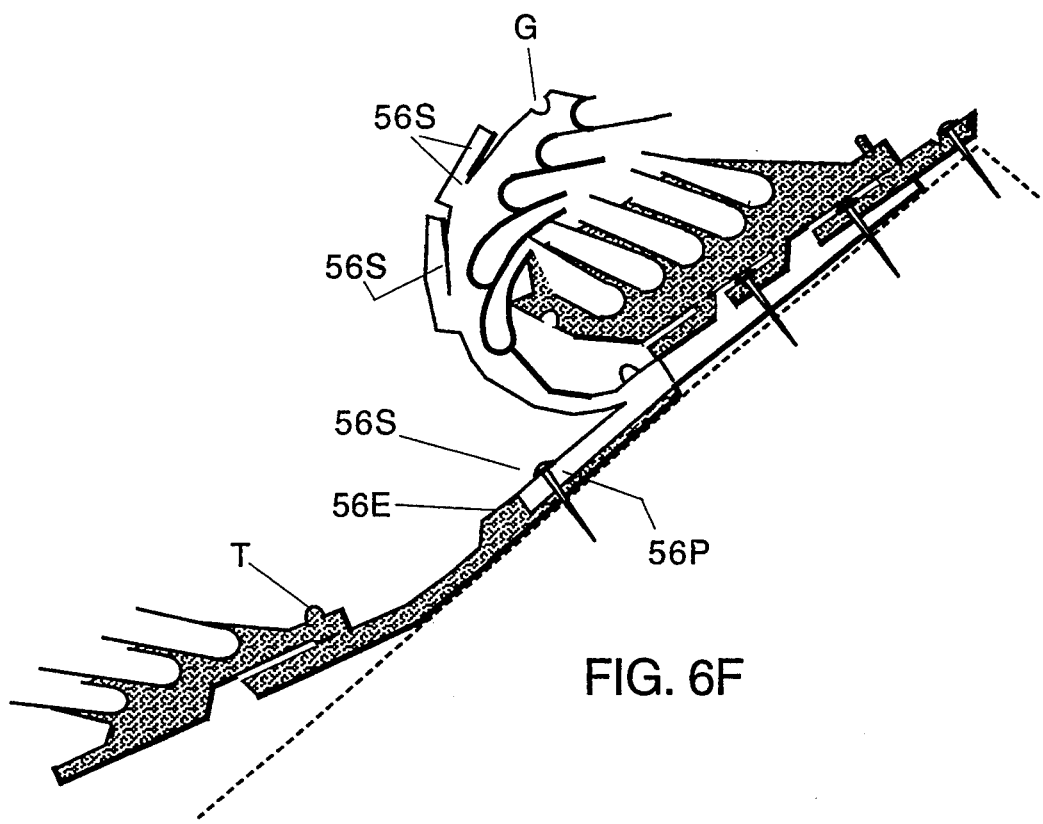
Figure 6G:
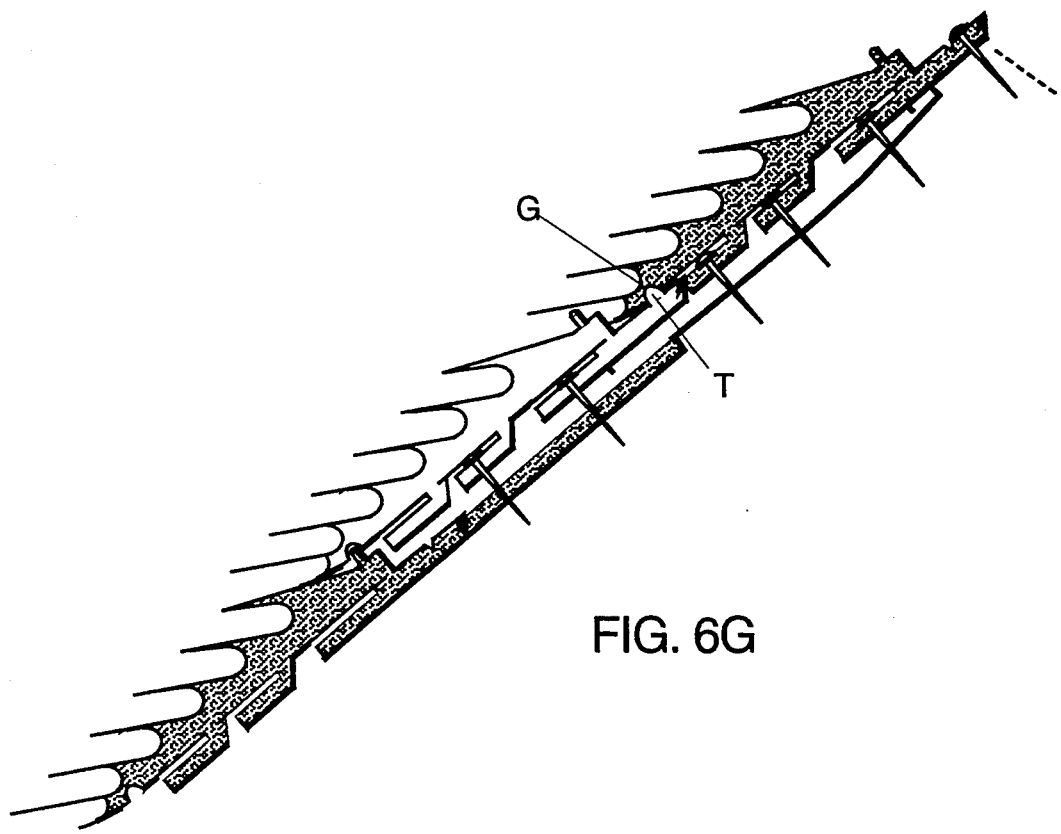

As shown in FIG. 6C, the upper roofing element may then be bent back on itself so that a line of nails 65 can be applied. As shown in FIG. 6B, the upper element is then rolled back downwardly such that alignment rib or ridge or tongue 54 is fitted into alignment groove 57 and edge 59 fits into corner 58, and the circular groove G snaps into engagement with circular tongue T as shown in FIG. 6E. This construction thereby mechanically interlocks the roofing elements to each other and further stabilizes the finished roof. The process is repeated as shown in FIGS. 6F and 6G to complete the roofing. In each case, the individual roofing elements per se may be unrolled from a roll such as shown in FIG. 3B or be individual shingles as shown in FIG. 3A. In the embodiment shown in FIGS. 1 and 6A–G, there are no exposed nail heads and there are positive mechanical interlocking of each edge of each roofing element with the preceding or succeeding roofing elements.

Referring to FIGS. 7A, 7B and 7C, a ridge cap roofing member 70 having symmetrically identical sides 71 and 72 joined by roof apex member 73. An attachment tabs 74 and 75 and grooves 76 and 77 are the main securement means. As shown in FIG. 7B, the edge 74E of tab 74 is butted against edge 59 on the upper-most roofing element (see FIG. 4A) and a line of nails is driven into attachment tab 74, then the portion 71 is laid down upon the upper edge of the lower roofing element so as to engage groove 76 with rib 54. The same procedure is followed on the side 72 of the ridge cap strip 70. Because of the high degree of flexibility in ridge cap 70, the ridge cap can adjust to varying pitched roofs as illustrated diagrammatically in FIG. 7C.

While the ridge cap in FIGS. 7A, B and C has four vanes, blades or fins per side 71 and 72, it will be appreciated that more or less vanes may be included as desired.

In FIGS. 8A, 8B and 8C, is diagrammatically illustrated a guttering system which can be integrally formed with the roofing. The lowermost roof element 80 includes a specially configured edge installed in place of a gutter. In this embodiment, the lower fins, blades or vanes 81 are provided with through slots 82 so that water running off the roof (see FIG. 8B) will drain therethrough so as to form a sprinkling mist. Optionally, a gutter can be formed by a non-perforated extension 84 which is curled back to form a channel 85 and secured either to the facia or edge of the roof at 86. As shown in FIG. 8C, the gutter 84 can cause the flow to go in one direction or can be lower at the lateral ends so as the water flows from the center towards the lateral ends and a down-spot (not shown) may be used to collect the water and carry it away from the protected structure.

Figure 9:
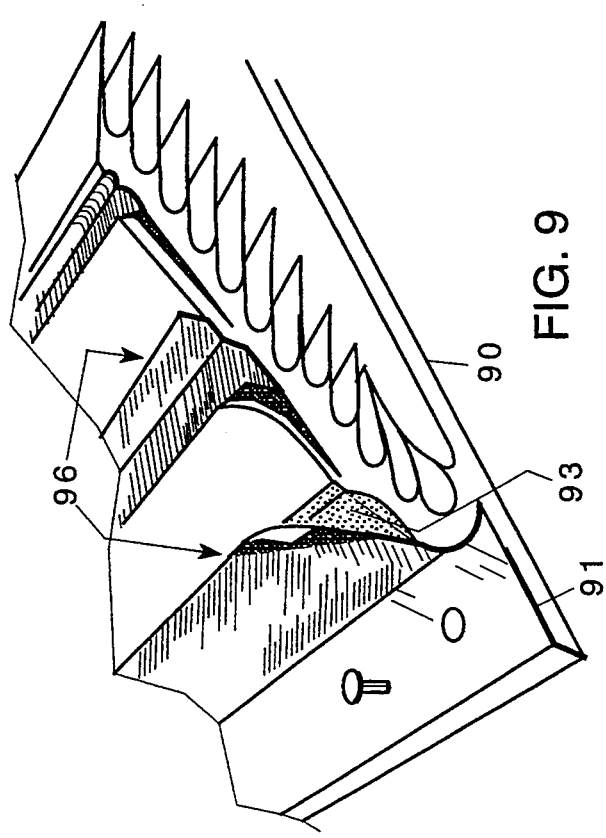
FIG. 9 illustrates a further alternative embodiment of the invention.

In FIG. 9, the flexible base 90 has a plurality of nailing strips 91 integrally extruded therewith and an adhesive or sealant 93 may be applied to the backside or underside of the portion 95 overlying the nailing strips and a removable protector strips 96 inserted thereon so that after each nailing strip 90 has been nailed, the protector strips 97 may be removed so that the adhesive surface may be adhered to cover and seal the nail heads.

Figure 10:
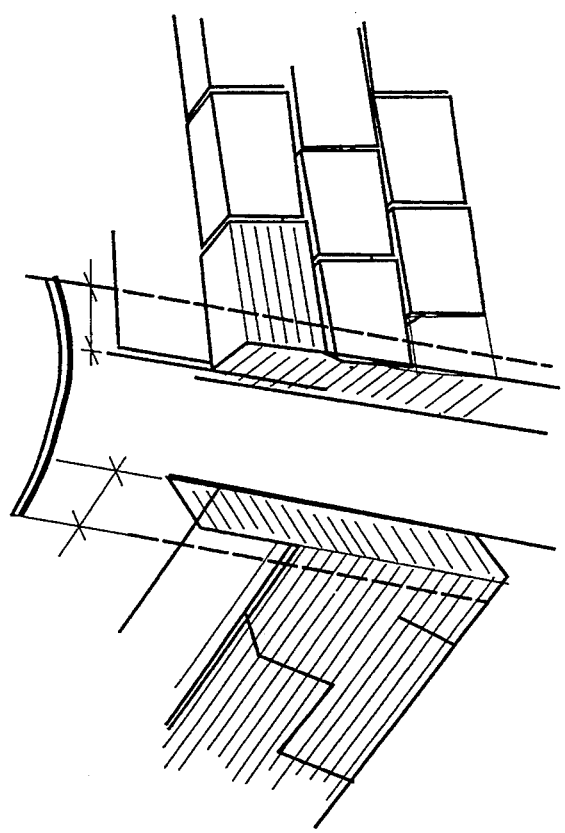
FIG. 10 illustrates a further embodiment of the invention.

FIG. 10 illustrates how the blades, fins or vanes may be slit so as to provide the appearance of overlapping shingles.

Figure 11:
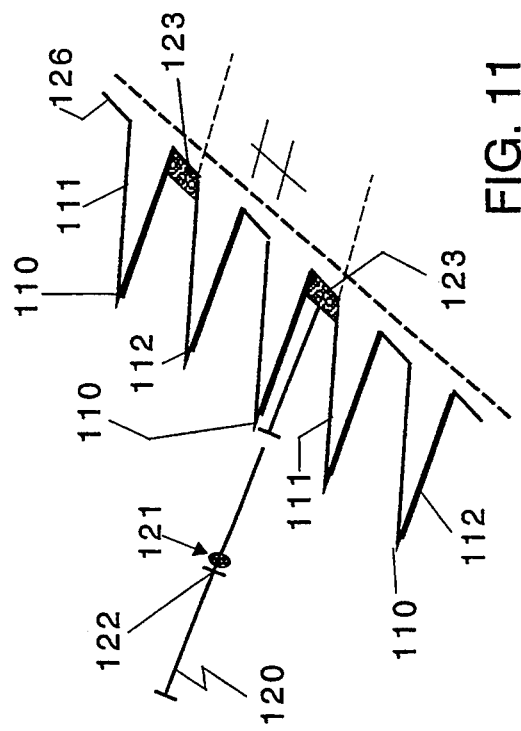
FIG. 11 illustrates a folded configuration of the invention.

In the embodiments shown in FIGS. 11 and 12, instead of a base member, the sheet is folded or pleated. Each of the vanes, blades or fins 110 is constituted by a triangular arrangement composed of two sheets 111 and 112 with a flat portion 123 for attachment by nails. In FIG. 11, a nail 120 having a sealant 121 on the shaft thereof with a sealant washer 122 so that as the nail is driven in the flat space 123, the nail is automatically sealed. The upper layer edge 126 may be used for nailing and overlapping purposes with an upper roofing element. Preferably, the nailing is between at least every other blade 110 since the elements 111 and 112 forming each blade are not joined at their bases. That the flat attachment spaces 123 can be adhered to a carrier substrate (FIG. 13B) by an adhesive (not shown) so as to maintain the spacing between the roots or bases of surfaces 111 and 112 or, instead of a continuous space substrate, strips 127 may be adhesively adhered to these flat attachment spaces 123. As shown in FIG. 13A the embodiment shown in FIG. 12 may be rolled up into rolls 130 or in prebonded flat sheets 135, 136 . . . as shown in FIG. 13B.

Figure 14B:
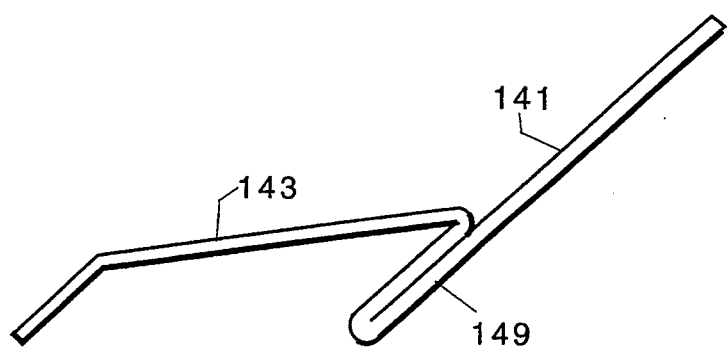
FIG. 14B is a sectional view of a single element shown in FIG. 14A.
Figure 15:
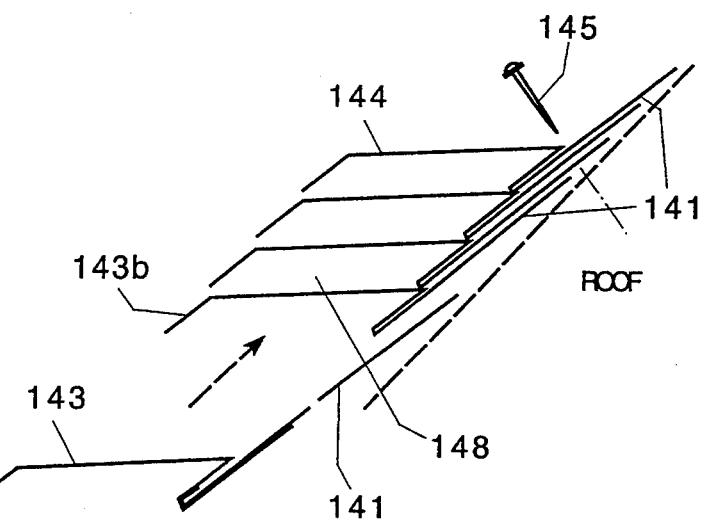
FIG. 15 illustrates the embodiment of FIG. 14 mounted on a roof.

Referring to FIGS. 14A and 14B, instead of a plurality of blades, fins or vanes being on a common carrier or integrally connected together, there may be many small single sheets. In FIG. 14A, a mounting panel 141 has mounting strip 142 for nailing purposes and each blade, fin or vane 143 is provided with vent holes 144. As shown in FIG. 15, a group of four small individual vane elements are ganged or stacked together and a fifth is shown being inserted. A single nail 145 is used to secure the ganged assembly to the roof structure. The folded elements 149 form gauges or stops to facilitate accurate installation. Note that the bent overhang 143B forms semi-closed channels 148 and shadow the next lower blade or vane.

In a further embodiment of roofing according to the invention, illustrated in sectional view in FIG. 16, ranks of elongated pockets or cells 211 are provided to form air cells which provide a first insulating effect and, integrally formed with the air cell structure are a plurality of vanes, fins or blades 212 which are formed integrally with the upper surface reflecting surfaces US. Vents between individual blades or fins are provided to permit air flow by convection or wind effects.

Figure 17:
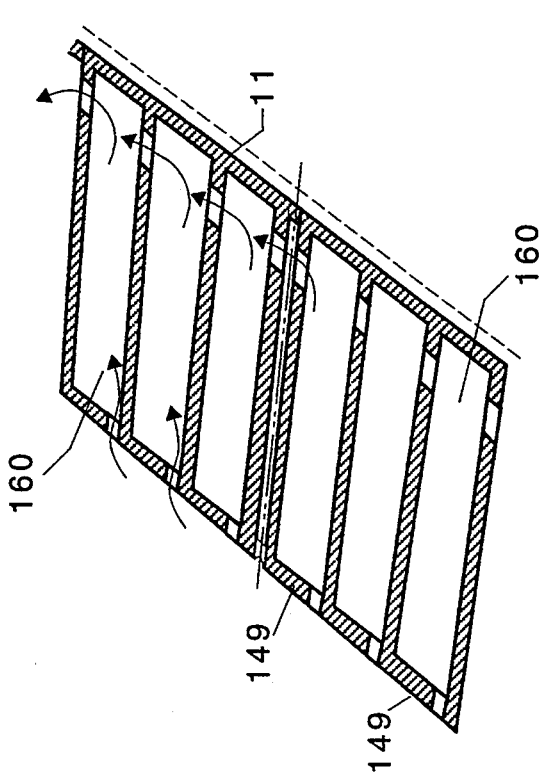
FIG. 17 is a further embodiment of the invention.
Figure 18B:
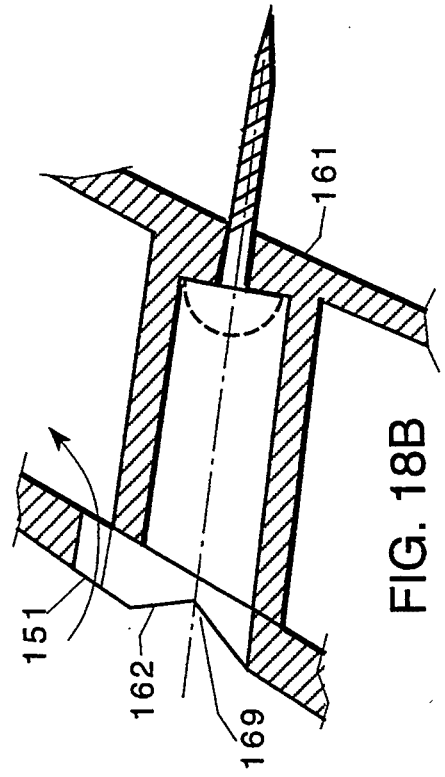

In the embodiment shown in FIG. 17, the extruded roof covering elements have the blades, vanes or fins joined together at their outermost extremities 149 to form the roofing element. In this case, vent holes 150 in the outer connector elements 151 and in the vane elements 152 allow air for the convection and flow of air in and out of the channels.

Figure 18A:
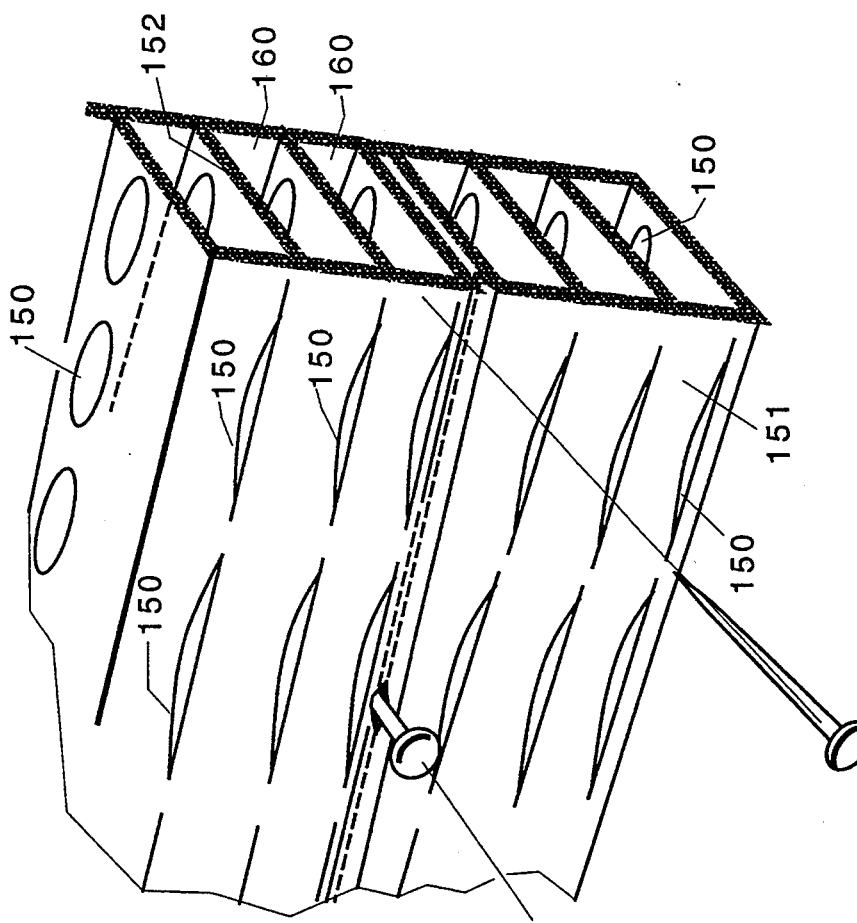
FIGS. 18A and 18B illustrate the mounting and nailing, respectively, of the embodiment shown in FIG. 17 to a roof.
Figure 19:
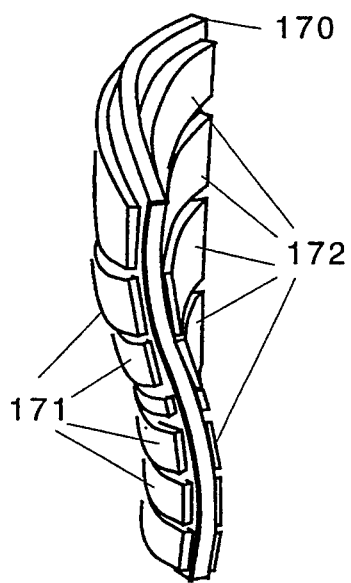
FIG. 19 illustrates the construction of a plug strip for the ends of the embodiment shown in FIG. 18.
Figure 20:
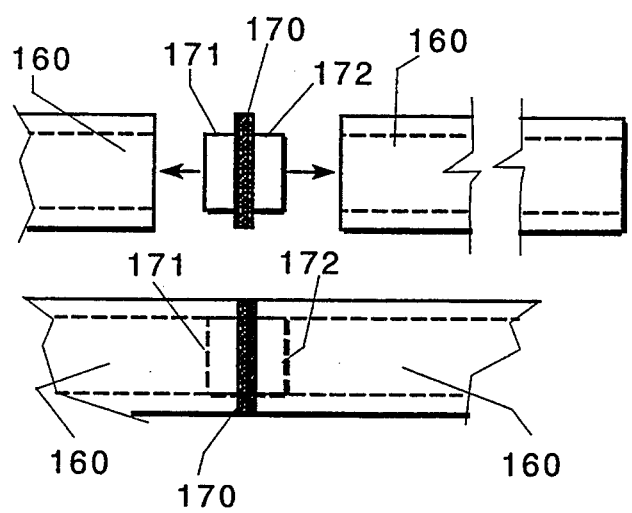
FIG. 20 illustrates the installation of the plug strip between two adjacent elements of the type shown in FIG. 18, FIGS. 21 and 22 and are perspective and side elevational views of a further embodiment of the invention.
Figure 21:
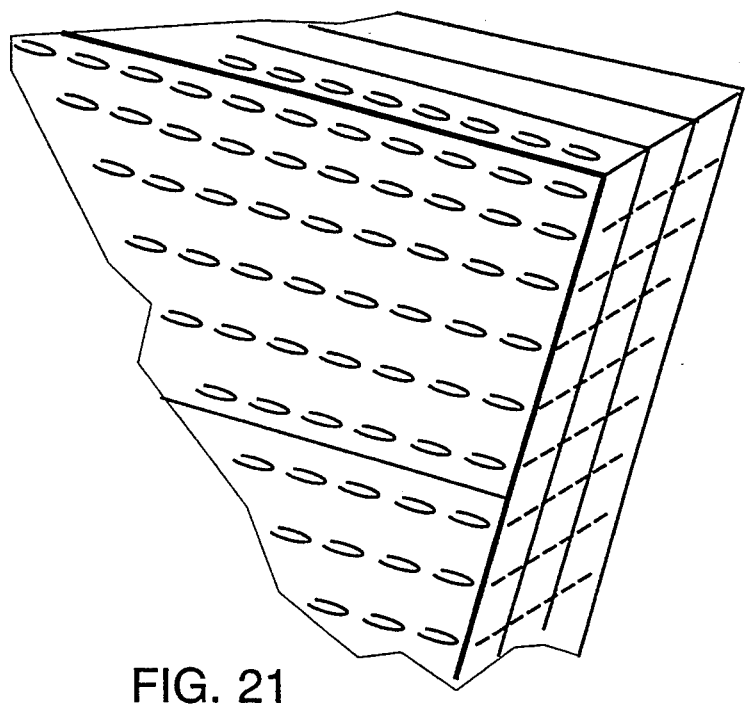
Figure 22:
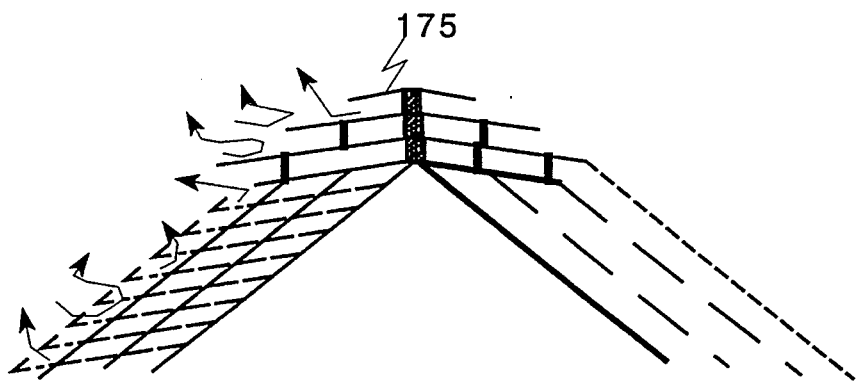

As shown in FIG. 18A, the outside surfaces of the connector strips are slit or otherwise perforated to permit air to flow therethrough. In addition, screw or nailing strip 161 has a slit 169 in the outer connector 162. This permits nails or screws to be inserted so that the structure in effect is self-sealing. As shown in FIG. 19, flexible plug carrier 170 has plugs 171 and 172 on the left and right sides (relative to FIG. 20), which are dimensioned to fit snugly within the ends of the channels 160. Note that the channel containing the nailing strip is also provided with a plug for sealing that channel. By forming the plug members 171 and 172 on both sides of base strip 170, the ends of adjacent strips can be plugged, if desired (see FIG. 20). Added insulation can be provided by stacking assemblies of the type shown in FIGS. 21 and 22. A peak cap member 175 can be provided and attached in essentially the same way as described in connection with FIG. 7A, 7B and 7C.

Figure 23:
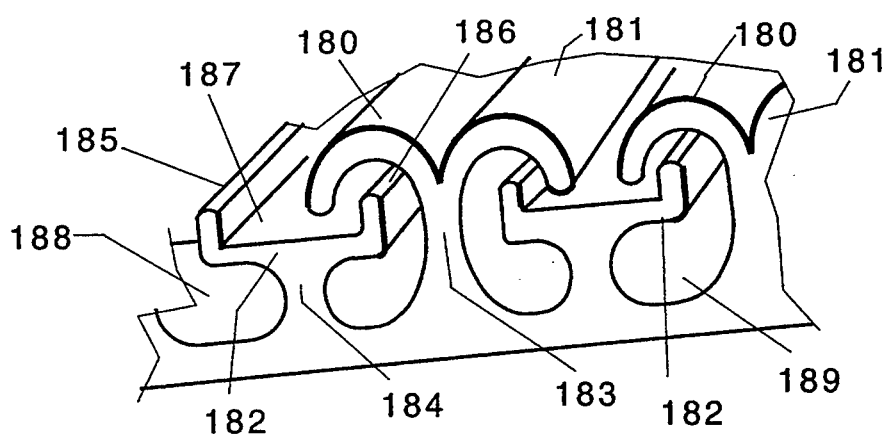
FIG. 23 is a perspective view of a further embodiment of the invention in which pairs of vanes, blades or fins are mounted on pedestals in overshadowing fashion over a further pair of pedestal mounted vanes, blades or fins.

Referring now to FIGS. 23, an embodiment of a self-shading roof according to this invention is comprised of an extruded panel having a base 180 with integrally formed shading and channel members 182 and 183, respectively. Elements 182 have a pedestal 184 supporting a channel 185 having upstanding legs 185, 186 and a flat base 187. The pedestal forms a pair of side air passages. Pedestals 183 have curved vanes 180, 181 extending to the left and right to provide shade to the underlying portions of channel 185 which, in turn, provides shading along the air passages 188 and 189.

Figure 24:
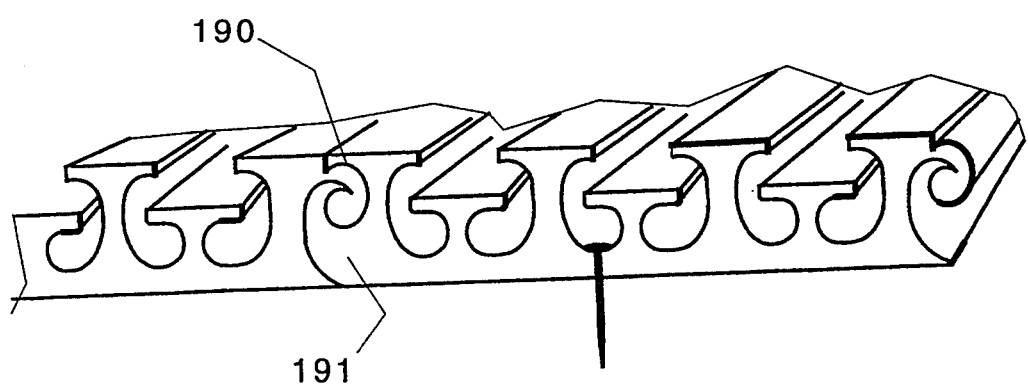
FIGS. 24 illustrates a perspective view of a further embodiment of the invention with large and small "T" shaped overlapping blades and interconnect between edges of contiguous roofing elements.

In FIG. 24, the right and left edges of two roofing elements incorporating the invention are provided with complementary interlocking edge formations 190 and 191, respectively. Since these are made out of plastic rubber or rubber-like materials and hence are relatively flexible, it is easy to interfit these elements either by sliding them in or by simply using a plow-type tool to spread them apart and cause them to interfit much in the fashion of a zipper. As illustrated in FIG. 24, a self-sealing nail (on an adhesive backing) may be used to secure the roofing element on a roof structure. For nailing purposes, because of the high flexibility of the legs of the T two pedestals can be spread apart so that the nail can be driven through the base structure and into the roof sub-structure.

Figure 25A:
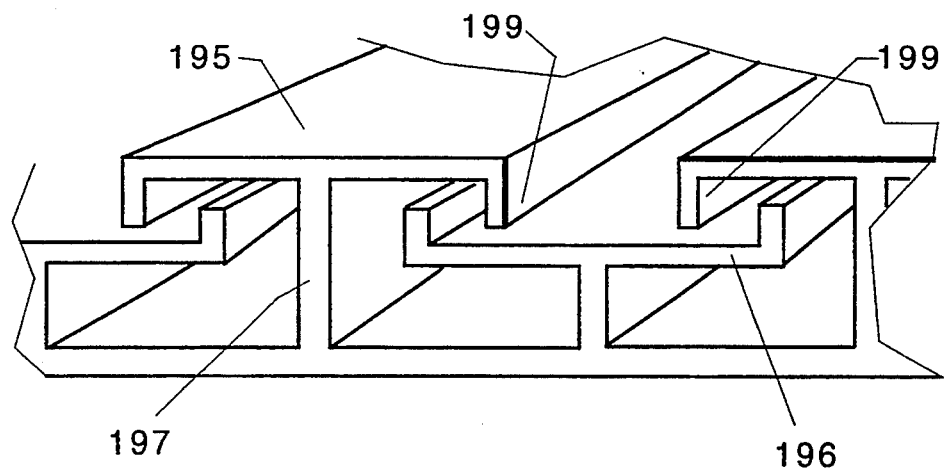
FIGS. 25A, 25B and 25C illustrate overlapping large, small T-configurated blades or vane elements in their overlapping relationship to shade the roof.
Figure 25B:
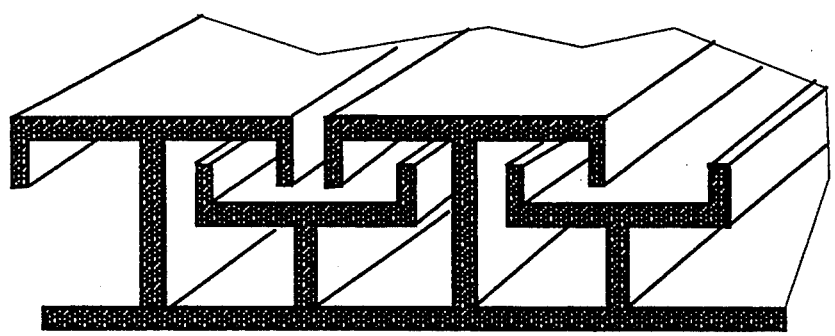
Figure 25C:
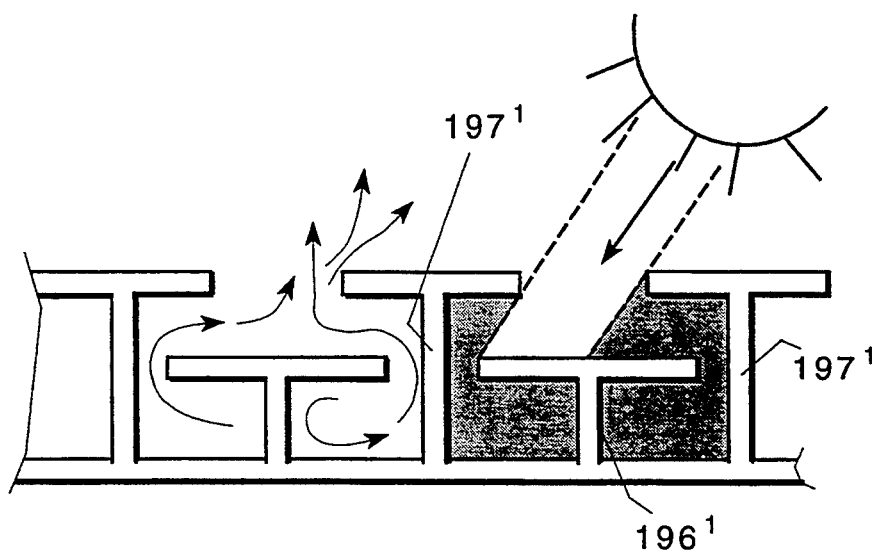

In FIGS. 25A and 25B, instead of being curved as in FIG. 24, the intervening vane, fin or blade members 195, 196 form part of an overlapping T structures, the stems "T" being integrally formed with the flexible base 197. In FIG. 25C, the vanes, blades or fins connect to the inner pedestal and those on the outer pedestal do not have downwardly depending ribs 199 as does FIG. 25A and FIG. 25B to facilitate heated air trapped in the channels flowing out by convection.

The sun shading aspect is illustrated graphically in FIG. 25C in the right section thereof. It will be appreciated that in those embodiments the base structure is always isolated or shaded from direct sun light. The inner surfaces can be dark to preclude reflections.

Figure 26:
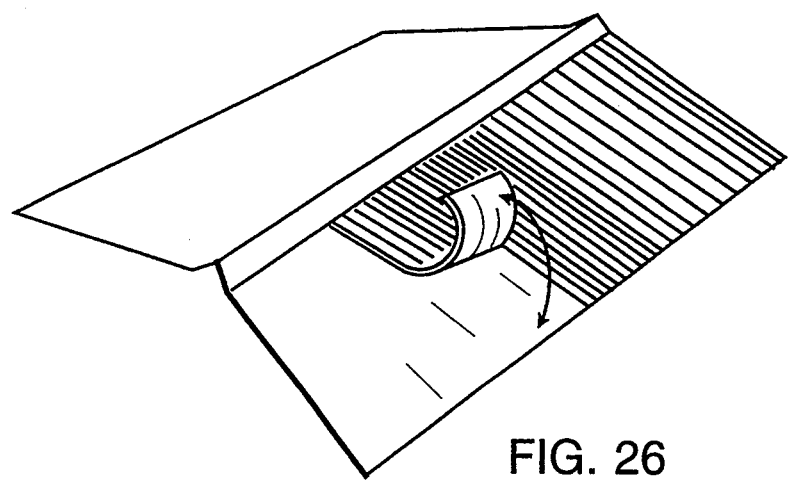
FIG. 26 illustrates the installation of the embodiments shown in FIGS. 23, 24, and 25A–C on a roof, FIG. 27 illustrate still a slanted tubular embodiment of the invention.

As shown in FIG. 26, the embodiments of the invention shown in FIGS. 24, 25A, 25B and 25C are applied preferably with the blades, fins or vanes running from the eave toward the roof top and vice versa. A ridge cover similar to that described earlier herein can be applied over the peak ends. The upper ends of the elements shown in FIGS. 24, 25A, 25B and 25C may be provided with an edge free of the rib structures to receive the peak element.

Figure 27:
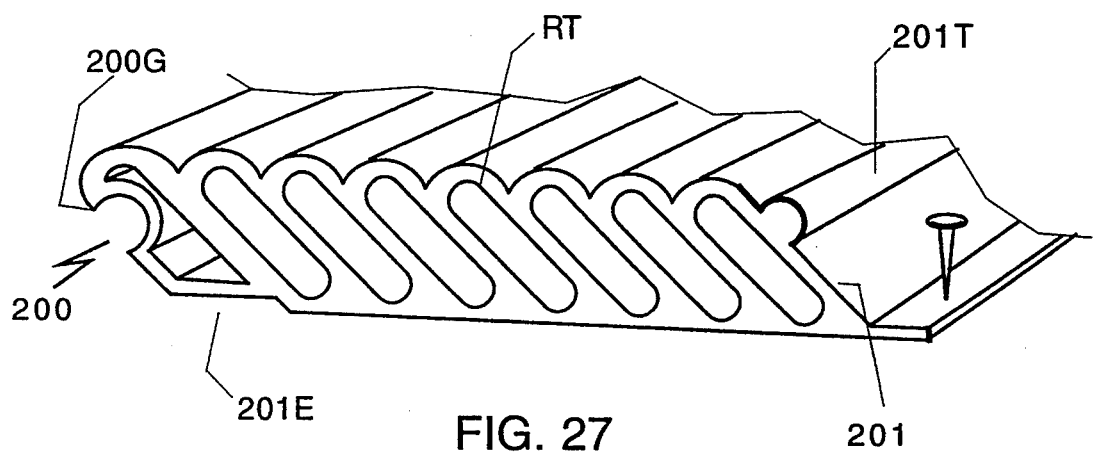
Figure 28:
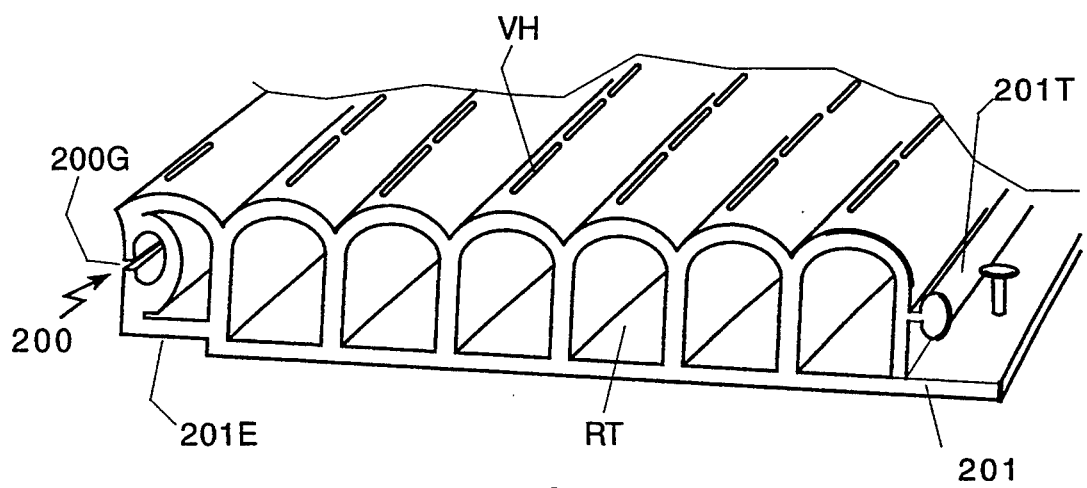
FIG. 28 illustrates still a vertical tubular embodiment of the invention.

FIG. 27 is similar to FIG. 28 except, in this instance, punch, drill, sawed, or melted perforation vent holes VH are in the tubes RT from which the vanes can be formed. The end overlapping structure 200 is complementary to the edge extension and ribs formed on the opposite side nailing edge 201, the envelope 200E covering and sealing the nailing strip 201 and tongue 201T fitting in groove 200G to provide positive mechanical interlock for the edges of each element, respectively, the embodiment of FIG. 30 is a variation on the embodiment shown in FIG. 28.

In FIG. 29, the vents may be formed by a variety of notching, punching operations which can be facilitated by bending the element over a mandrel M to spread the fins, vanes or blades apart. This operation can be executed as the roofing material leaves an extrusion die or later. As indicated, the notching (FIG. 2E) can also be performed in this fashion.

Referring now to FIG. 31, the installation on a roof is diagrammatically being illustrated as being fed from a truck 210 carrying rolls 211 of roofing 212 incorporating the present invention through a lifting and feed mechanism 213, the lift and feed mechanism assisting the installer 214 in laying out the roofing upon a roof. In this embodiment, the roofing is being layed from the bottom or eave side up towards the peak but it will be appreciated that with the other embodiments either approach can be utilized and, in connection with those embodiments where the roofing runs from the eave towards the peak or vice versa, the roofing can be fed vertically as shown in FIG. 26 instead of horizontally with the feed mechanism being located along the eave side of the structure.

Figure 32:
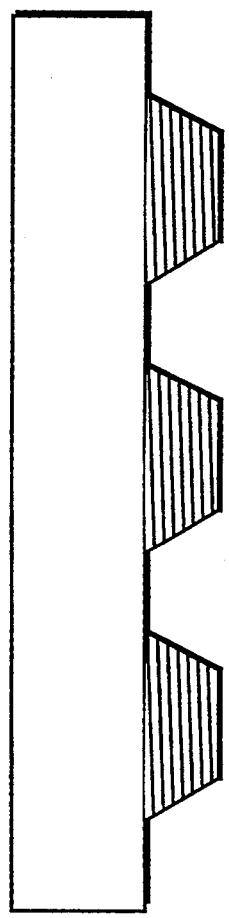
FIG. 32 illustrates the shingles with a decorative edge.
Figure 33:
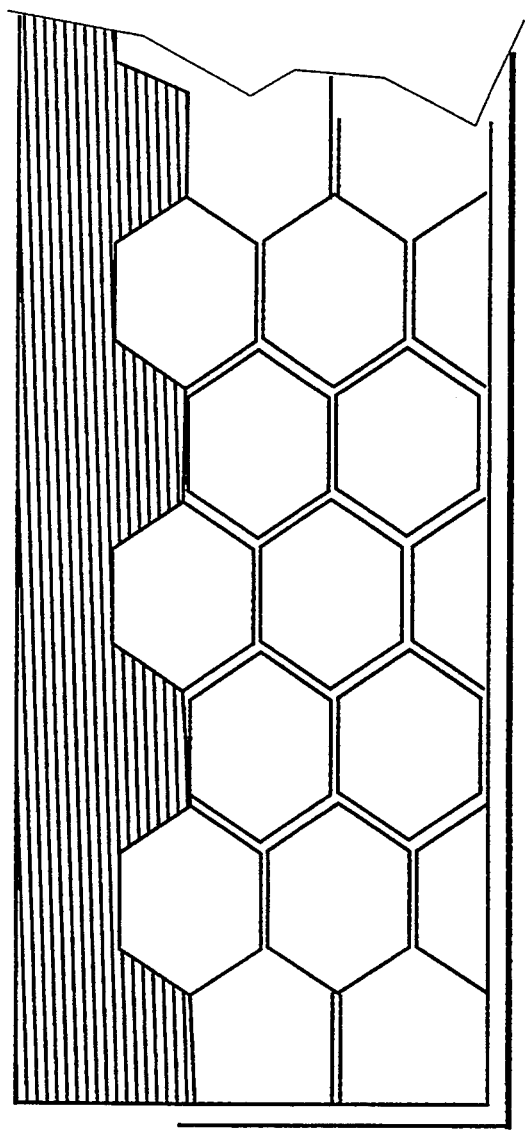
FIGS. 33 illustrates another decorative shingle designs installed on a roof.

Finally, as shown in FIG. 32, the roofing elements can be provided with slits or with decorative edges. FIG. 33 illustrates another decorative shingle design incorporated in a roof cover incorporating the invention.

It will be appreciated that there has been shown and described a preferred embodiments of the invention and it will be appreciated that various other embodiments, modifications and adaptations of the invention will become readily apparent to those skilled in the art. It is intended that such other obvious adaptations and modifications be incorporated within the true spirit and scope of the claims appended hereto.

What is claimed is:

1. A roofing element for pitched roofs, comprising:
one or more vane members,
an integral mounting element for securing said one or more vane elements on said pitched roof,
said one or more vane members having a length extending at an angle other than 90 degrees from said integral mounting element such that when installed on said pitched roof with an array of further of said roofing elements, except for the upper most of said vane members, each vane member is in the shadow of an immediately upper vane member wherein each said roofing element includes means forming vent apertures in said one or more vane members.

2. The roofing element defined in claim 1 wherein said mounting element includes means forming one or more linear air passages therein.

3. The roofing element defined in claim 1 wherein each said vane has a root joined to said common base member and an outer end which is deflected in the direction of a lower vane.

4. The roofing element defined in claim 3 wherein said outer ends of said vanes are joined to form air channels.

* * * * *